No. 781,666. PATENTED FEB. 7, 1905.
H. M. LAUBER.
CORN OR COTTON CULTIVATOR.
APPLICATION FILED MAR. 6, 1903.
2 SHEETS—SHEET 1.
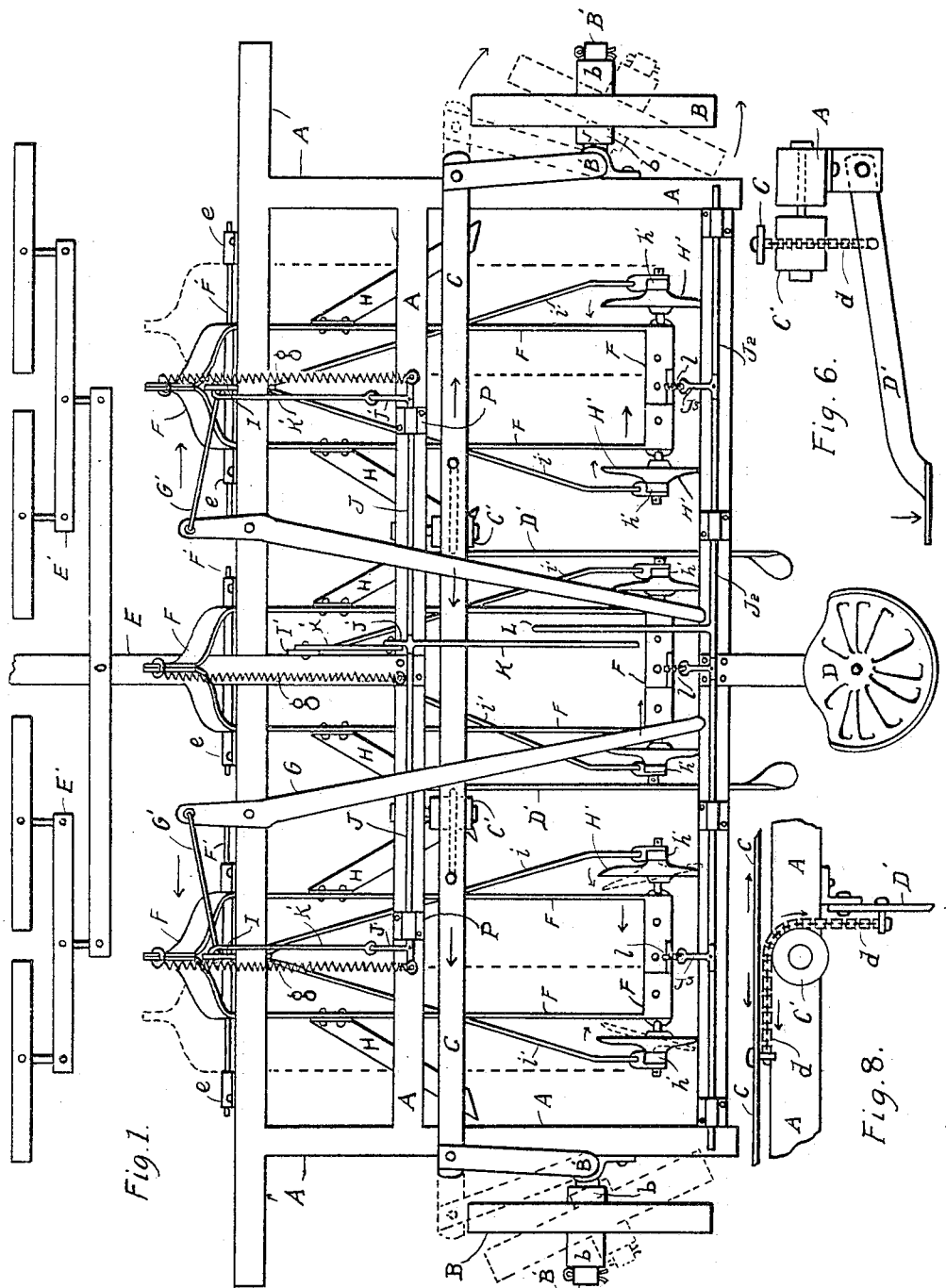
Witnesses.
E. Gray Powell
Emma Heckel
Inventor:
Henry M. Lauber
By Emerson Capers,
Attorney.

No. 781,666. PATENTED FEB. 7, 1905.
H. M. LAUBER.
CORN OR COTTON CULTIVATOR.
APPLICATION FILED MAR. 6, 1903.

2 SHEETS—SHEET 2.

Witnesses.
E. Gray Powell
Emma Hickel

Inventor.
Henry M. Lauber
By Eugene Ayres,
Attorney.

No. 781,666.

Patented February 7, 1905.

UNITED STATES PATENT OFFICE.

HENRY M. LAUBER, OF SAVANNAH, MISSOURI.

CORN OR COTTON CULTIVATOR.

SPECIFICATION forming part of Letters Patent No. 781,666, dated February 7, 1905.

Application filed March 6, 1903. Serial No. 146,464.

*To all whom it may concern:*

Be it known that I, HENRY M. LAUBER, a citizen of the United States, residing at Savannah, in the county of Andrew and State of Missouri, have invented certain new and useful Improvements in Corn or Cotton Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

The object of my device is to provide a cultivator adapted to cultivate small listed corn and cotton and that will cultivate three rows of the crop at one time, and I accomplish my object by means of the mechanism shown in the accompanying drawings, in which—

Figures 3, 4, 5:
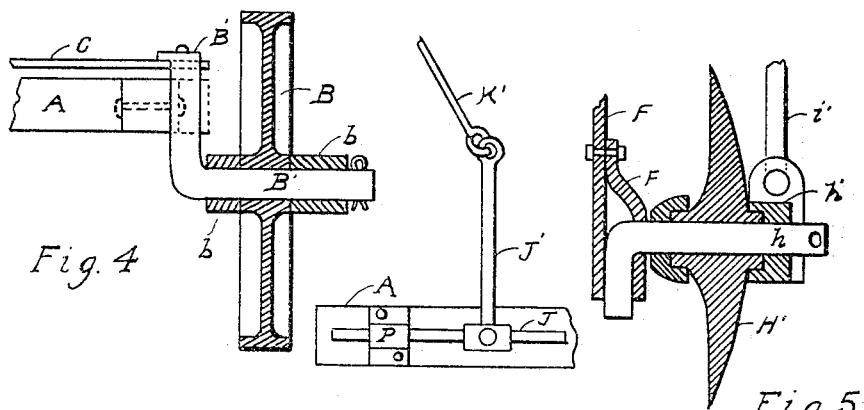
Figure 2:
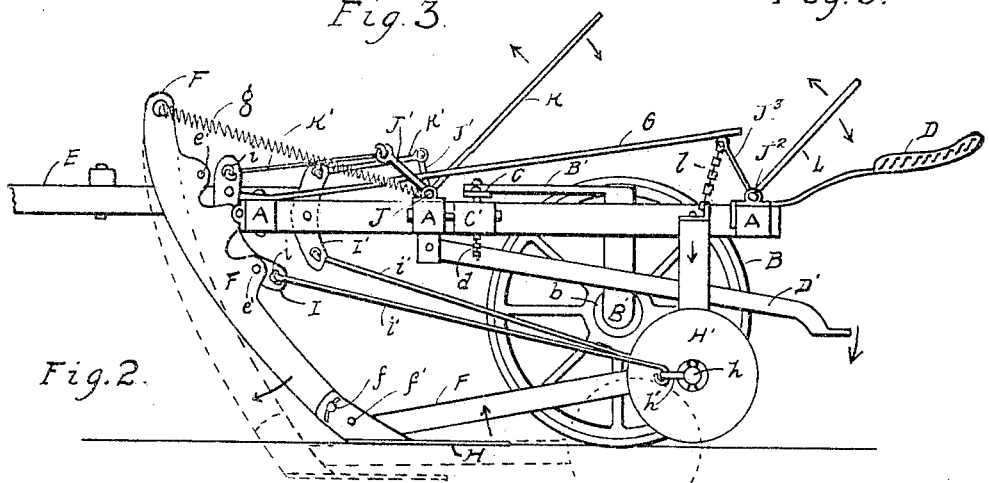
Figure 7:
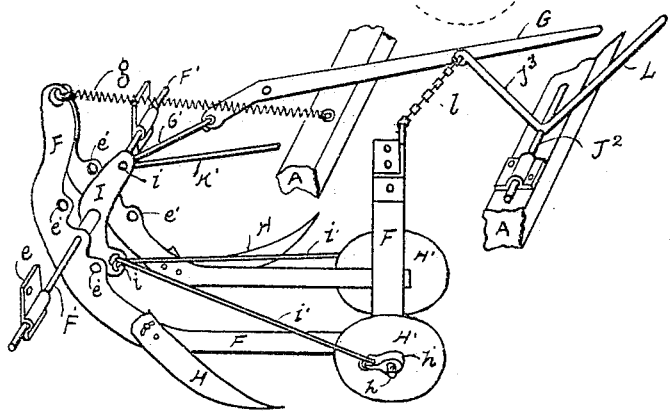

Figure 1 is a plan of the cultivator. Fig. 2 is a side view of said cultivator. Fig. 3 is a detail of the disk-shifting rod. Fig. 4 is a detail of one of the wheels of the machine upon its axle and connection with the wheel-shifting bar. Fig. 5 is a detail of the disk and its connections. Figs. 6 and 8 are details of a wheel-shift, of the bar, of one of the bar-rollers, and the chain forming connection between the wheel-shift and the bar; and Fig. 7 is a detail of a disk and the knife connected with the sled.

Similar letters refer to similar parts throughout the several views.

A represents the parts of the frame of the machine, said frame consisting of two end pieces, front and rear cross-pieces, and, preferably, a single cross-piece set approximately central therein; B B, the wheels.

B' B' are the axles, which at the inner ends of the wheel-hubs extend vertically to the top of the frame A and are then bent at a right angle and extend forwardly and are pivoted to the top of the shifting-bar C. *b* is the boxing for said axle.

D is the driver's seat. Near said seat and pivoted to the under side of the middle cross-piece of the frame are two foot-levers D' D'. These levers are connected with the shifting-bar C by means of chains *d d*. These chains extend over and are carried by two rollers C' C', which are under bar C and are carried by the center cross-piece of frame A. These chains are carried over said rollers in opposite direction, and their upper ends are fastened to the bar and their lower ends to the foot-lever at points below the rollers. The office of these levers D' D' is to shift bar C to the right or left, thereby shifting the wheels in either direction and making the machine run to right or left, as may be desired.

E is the tongue of the machine, and E' E' the doubletrees, the machine being suited to be hauled by four horses.

F F are sleds. They are provided with rigidly-attached hubs which are carried by rods F' F' and extended between each pair of sleds nearly to a point of contact with each other. These sleds each consist of a head with a lower bifurcation forming downwardly - curved shoulders with arms extended toward the rear of the machine, the rear ends being provided with vertical projections united at the top and serving as a lift. Rods F' F' are carried in the loops of castings *e e*, which are rigidly fastened to the front cross-piece of frame A. The two outside sleds are shiftable on their rods; but the central sled is not, the outside ones being so constructed to enable the machine to cultivate either wide-apart or close rows. In the upper part of these sleds I provide three perforations *e' e'*, thus enabling me to raise or lower the sleds on their rods.

Two horizontally-placed levers G G are pivoted on the front cross-piece of frame A, the ends of said levers projecting beyond the frame and their pivotal points.

Attached to the sleds are knives H H, their purpose being to cut the tops and sides of the ridges, thereby loosening the earth and destroying the weeds. These knives are pivoted at their front ends to the sleds by the use of a bolt, slot *f*, and hole *f''*, and are adapted to be raised or lowered on the sleds to the angle desired by the use of said bolt, slot, and hole. On the outside of the rear end of each of these sleds there is a disk H', carried on a short axle *h*. These disks are slightly concave, adapting them to throw the earth toward the corn or cotton rows. The outer ends of axles *h h* are provided with caps *h' h'* for retaining the disks thereon. The rear end of each sled is preferably looped and the inner end of each axle $h$ bent downward at a right angle, as shown in Fig. 5, and carried loosely therein, thus permitting the disk to be thrown in and out upon its axle. A short bearing upon this axle prevents the disk from contact with the sled.

Pivoted centrally on rods $F'$ $F'$ between the hubs of each of the two shiftable sleds are curved castings I I, provided with perforations $i$ $i$ at the upper and lower ends. From the lower perforation on each of these are diverging rods $i''$ $i'$, whose rear ends are connected with caps $h'$ $h'$. Rods $G'$ $G'$ make connection with perforations in the front ends of horizontally-placed levers G G and with curved castings I I at points somewhat above the axles of said castings, said levers G G being thus enabled to shift the sleds, their knives, and disks. A curved casting $I'$, similar to curved castings I I and with similar connections with caps $h'$ $h'$ on the disk-axles, is pivoted to a side of the frame end of the tongue, the central position of the tongue preventing said casting $I'$ being pivoted on central sled-rod $F'$.

Upon the central cross-piece of the frame A there are castings P P, retaining in position a horizontally-extended round rod J, on which are three vertical rods $J'$, rendered adjustable by means of set-screws. A central cast-iron lever K is attached to said rod J like the rods $J'$ $J'$. Engaging with the loop at the upper end of each of rods $J'$ there is a rod $K'$, which at its other end makes connection with a perforation $i$ in the upper end of one of the curved castings I $I'$. The axles of the disks being set loosely, I am enabled through this connection to throw the disks at angles suited to throw more or less dirt to the corn or cotton, as may be desired.

A lever L, similar to lever K, provided with lateral extensions $J^2$, is connected with the rear cross-piece of frame A by means similar to the connections of lever K. Said lever L is also connected to the rear of each of said sleds by means of an arm $j^3$ and a loosely-hanging chain $l$, thus enabling it to raise or lower the sleds and their knives and disks whenever a turn of the machine is made or for any purpose.

Attached to the elevated tops of the fronts of sleds F F are coil-springs $g$ $g$, the opposite ends of which make connection with the middle cross-piece of frame A. These springs are adapted to force and hold the peripheries of the disks below the surface of the earth.

What I claim, and desire to secure by Letters Patent, is—

1. The combination with a cultivator-frame and its wheels and the means for shifting said wheels, of three sleds carried upon rods attached to the front of the frame, the knives extending outwardly therefrom, and provided with slots and holes to permit adjustment of the knives upon the sleds which are also provided with corresponding holes, substantially as described and for the purpose specified.

2. The combination in a cultivator of the front cross-piece of the frame, the rods carried thereby and the sleds pivoted on said rods, the duplicate concave disks and their axle-rods on each sled, the caps provided with perforations on the outer ends of said axle-rods, the curved castings carried by the sled-rods, the duplicate rods connected with the lower end of each of the curved castings and diverging therefrom to connection with said caps, a central cross-piece on the frame, the lever carried by the central cross-piece and provided with lateral extensions and vertical rods and the rods each forming connection between a lever vertical rod and the upper end of a curved casting, said lever and connecting mechanism being adapted to swing the disks in the direction desired, substantially as shown and described.

3. The combination with the frame of a corn and cotton cultivator provided with shiftable wheels and axles having upward extensions and sleds pivotally attached to the front cross-piece of the frame and the knives, disk-axle rods and disks carried by the sleds, of the rear cross-piece of the frame, the lever, the lateral extensions thereof and the arms supported by said rear cross-piece, and the chain connecting the top of the rear of each sled and one of said arms, said lever being adapted to lift and lower the sleds and their knives and disks, substantially as shown and set forth.

4. In a corn and cotton cultivator having shiftable wheels, of the front cross-piece of the frame and a central non-shiftable and the outer shiftable sleds pivotally connected therewith, the knives, and disks and disk-axle rods and caps carried by the sleds, the central cross-piece, and the coil-springs each connected at one end with said central cross-piece, and at the other end with the top of the front end of a sled, said coil-springs being adapted to hold the peripheries of the disk beneath the soil, substantially as described.

5. The combination with a corn and cotton cultivator provided with triplicate sets of sleds, knives and disks, and duplicate shiftable wheels having axles extended upwardly, of the central cross-piece of the frame and the rollers mounted thereon, the shifting-bar adapted to travel on said rollers and the ends of which are pivotally connected with the axle extensions, the duplicate foot-levers and the cables carried over said rollers in opposite directions, the ends of which are attached to said bar and lever, substantially as described and shown.

In testimony whereof I affix my signature in presence of two witnesses.

HENRY M. LAUBER.

Witnesses:
J. J. METCALF,
J. W. HAIGHT.